United States Patent [19]
Adams et al.

[11] Patent Number: 6,115,215
[45] Date of Patent: Sep. 5, 2000

[54] BALANCED ACTUATOR WHICH ACCESSES SEPARATE DISC ASSEMBLIES

[75] Inventors: Carl F. Adams, Yukon; Carrie R. McKie, Oklahoma City, both of Okla.

[73] Assignee: Seagate Technology, Inc., Scotts Valley, Calif.

[21] Appl. No.: 09/105,684

[22] Filed: Jun. 26, 1998

Related U.S. Application Data

[60] Provisional application No. 60/075,736, Feb. 24, 1998.

[51] Int. Cl.[7] ....................................................... G11B 5/55
[52] U.S. Cl. ........................................ 360/106; 360/98.01
[58] Field of Search .................................... 360/106, 104, 360/98.01, 97.03, 98.07, 99.08

[56] References Cited

U.S. PATENT DOCUMENTS

| | | | |
|---|---|---|---|
| 3,864,747 | 2/1975 | Pejcha | 360/97.03 |
| 4,071,867 | 1/1978 | Pejcha | 360/106 |
| 4,620,252 | 10/1986 | Bauck et al. | 360/106 |
| 5,134,532 | 7/1992 | Svendsen et al. | 360/106 |
| 5,218,496 | 6/1993 | Kaczeus | 360/106 |
| 5,267,110 | 11/1993 | Ottesen et al. | 360/106 |
| 5,343,345 | 8/1994 | Gilovich | 360/106 |
| 5,486,965 | 1/1996 | Yoshida et al. | 360/106 |
| 5,764,441 | 6/1998 | Aruga et al. | 360/106 |

*Primary Examiner*—Craig A. Renner
*Attorney, Agent, or Firm*—Crowe & Dunlevy

[57] ABSTRACT

A disc drive assembly having a pair of disc packs supported for rotation by independent spindle motors and a single actuator having dual arrays of actuator arms supporting read/write heads for each disc pack. The actuator has dual opposing actuator coils which interact with dual opposing magnet assemblies so that a controlled voltage to the actuator coils creates a rotating force having translational vectors that act radially on the actuator and are opposingly disposed to stabilize the actuator.

15 Claims, 4 Drawing Sheets

BALANCED ACTUATOR WHICH ACCESSES SEPARATE DISC ASSEMBLIES

RELATED APPLICATIONS

This application claims the benefit of United States Provisional Application No. 60/075,736 entitled HARD DISC DRIVE WITH MULTIPLE DISC PACKS AND A SINGLE ACTUATOR, filed Feb. 24, 1998.

FIELD OF THE INVENTION

The present invention relates generally to the field of disc drive data storage devices, and more particularly but not by way of limitation, to a disc drive assembly employing opposed voice coil motors and reduced-diameter, dual disc packs to reduce operational resonance and to reduce the effects of external shock and vibration on the disc drive assembly.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

Two continuing trends in the disc drive industry are in the reduction in physical size and in increased data storage capacity. As a result, the disc pack has been increasingly made smaller, requiring the use of thinner discs with tighter disc-to-disc spacing. The areal density of stored data has steadily increased, heightening the positioning precision requirements of the read/write head in relation to the rotating disc.

Although providing increasing amounts of storage capacity, these changes give rise to a problem of increased sensitivity to operational resonance. Additionally, these changes significantly increase the likelihood that external mechanical shock and vibration will result in physical contact between the actuator assembly and the disc surfaces and thereby damage stored data. Absent physical contact, certain frequencies can also cause the transducer to move off-track. That is, resonance can affect the ability of the servo system to maintain the transducer in a desired relation to a followed track and can lengthen the time required to settle the transducer onto a destination track at the conclusion of a seek.

In response to the continuing market demand for ever smaller disc drives and increased storage capacity there is a need in the industry for an improved disc drive apparatus that is capable of increased data storage capacity and which exhibits improved resilience to external forces and operational resonance.

SUMMARY OF THE INVENTION

The present invention is directed to a disc drive having multiple disc packs. In a preferred embodiment, the disc drive has a pair of disc pack assemblies that are independently rotated by spindle motors, and having a single actuator for reading data from and writing data to the disc pack assemblies.

The actuator has an E-block member that forms dual arrays of actuator arms, each array supporting a plurality of read/write heads adjacent the data discs of the disc pack assemblies. The E-block pivots about a pivot shaft bearing so that the actuator arms position the read/write heads in data read and write relationship to both disc packs simultaneously. In this manner the disc drive can access selected data tracks on both disc packs for a given rotational position of the E-block.

The actuator is rotated by a pair of opposing actuator coils that are supported by the E-block. The actuator coils cooperate with a pair of opposing magnet assemblies so that when a controlled voltage is introduced to the actuator coils an electromagnetic force field is created that selectively rotates the actuator. The electromagnetic force field produced by each actuator coil and magnet assembly combination has orthogonal components of force that act along directions that are tangential and translational to the pivot shaft bearing.

The opposed tangential forces are additive and tend to rotate the E-block about the pivot shaft bearing. The opposed translational forces act radially to the pivot shaft bearing. The translational forces are thus uniformly distributed about the pivot shaft bearing and tend to cancel each other out, effectively reducing the resonance otherwise created by unbalanced out-of-plane forces.

The disc drive assembly furthermore utilizes smaller diameter discs for the same data storage capacity as a comparable single disc pack disc drive, which provides superior resilience to external shock and vibration.

These and other advantages and features of the present invention will be apparent from the following description when read in conjunction with the drawings and appended claims.

DETAILED DESCRIPTION

Figure 1:
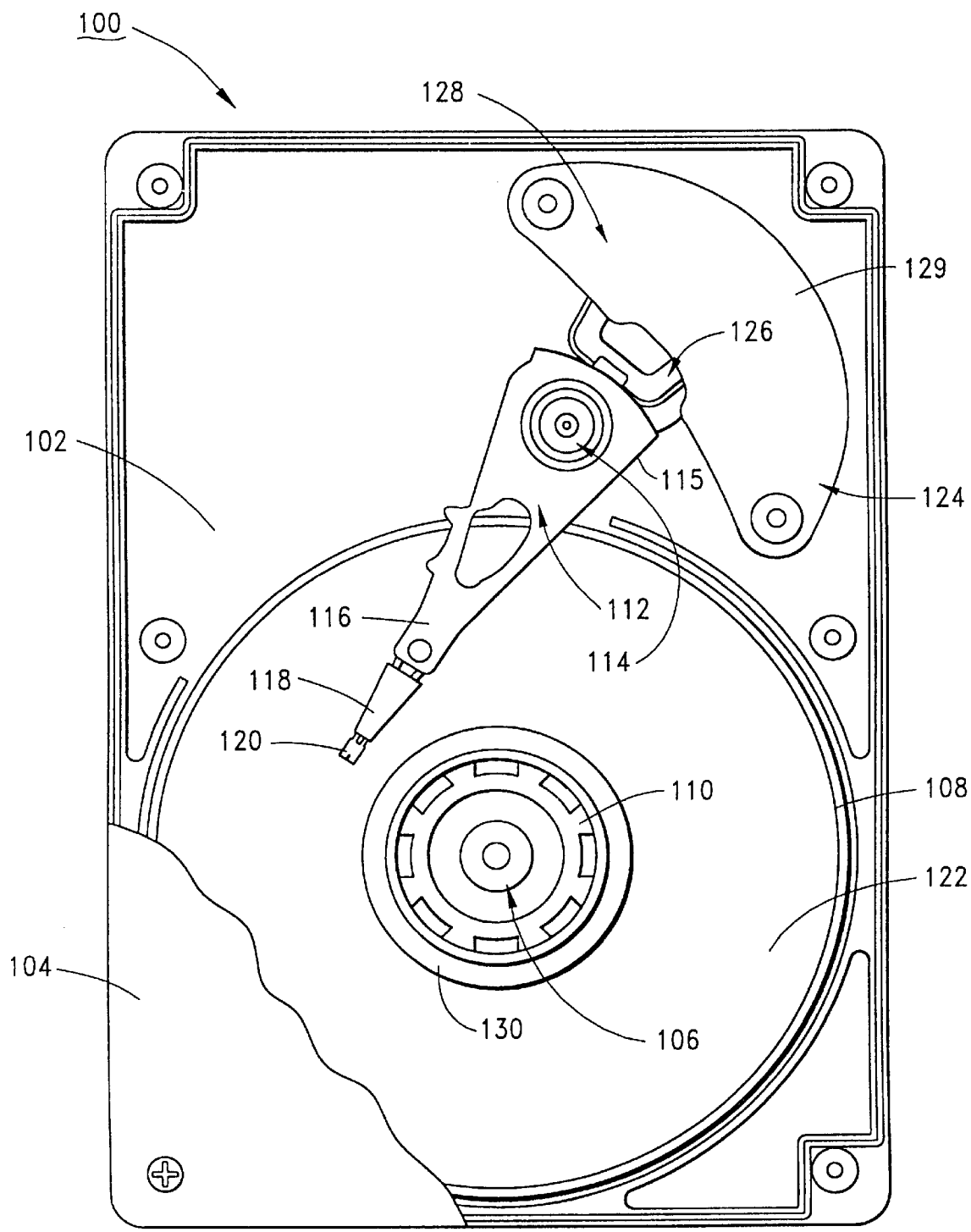
FIG. 1 is a top view of a prior art disc drive.

Referring to the drawings in general, and more particularly to FIG. 1, shown therein is a top view of a prior art disc drive 100 which is presented for comparison sake. The disc drive 100 includes a base deck 102 and a top cover 104. Mounted to the base deck 102 is a spindle motor 106 to which a plurality of discs 108 are mounted and secured by a clamp ring 110 for rotation at a constant high speed.

An actuator assembly 112 pivots about a pivot shaft bearing 114 which is, in turn, supported by the base deck 102 and top cover 104. The actuator assembly 112 has actuator arms 116 (only one shown) that support load arm assemblies 118 which, in turn, support read/write heads 120. Each of the discs 108 has a data recording surface 122 and the read/write heads 120 are positionably located adjacent the data tracks to read and write data.

The actuator assembly 112 is positioned by a voice coil motor assembly (VCM) 124, which has an actuator coil 126 immersed in the magnetic field generated by a magnet assembly 128. A pair of pole members, such as steel plates 129 sandwich a pair of magnet members 131 around the actuator coil 126 (See FIG. 5) to provide the magnetic circuit of the VCM 124. When controlled current is passed through the actuator coil 126, an electromagnetic field is set up which interacts with the magnetic circuit of the VCM 124 to cause the actuator coil 126 to move relative to the magnet assembly 128.

Located near the inner clamp ring 110 are parking surfaces 130, the parking surfaces 130 being non-data surfaces that are designated areas where the read/write heads 120 come to rest when the disc drive 100 becomes non-operational.

Figure 2:
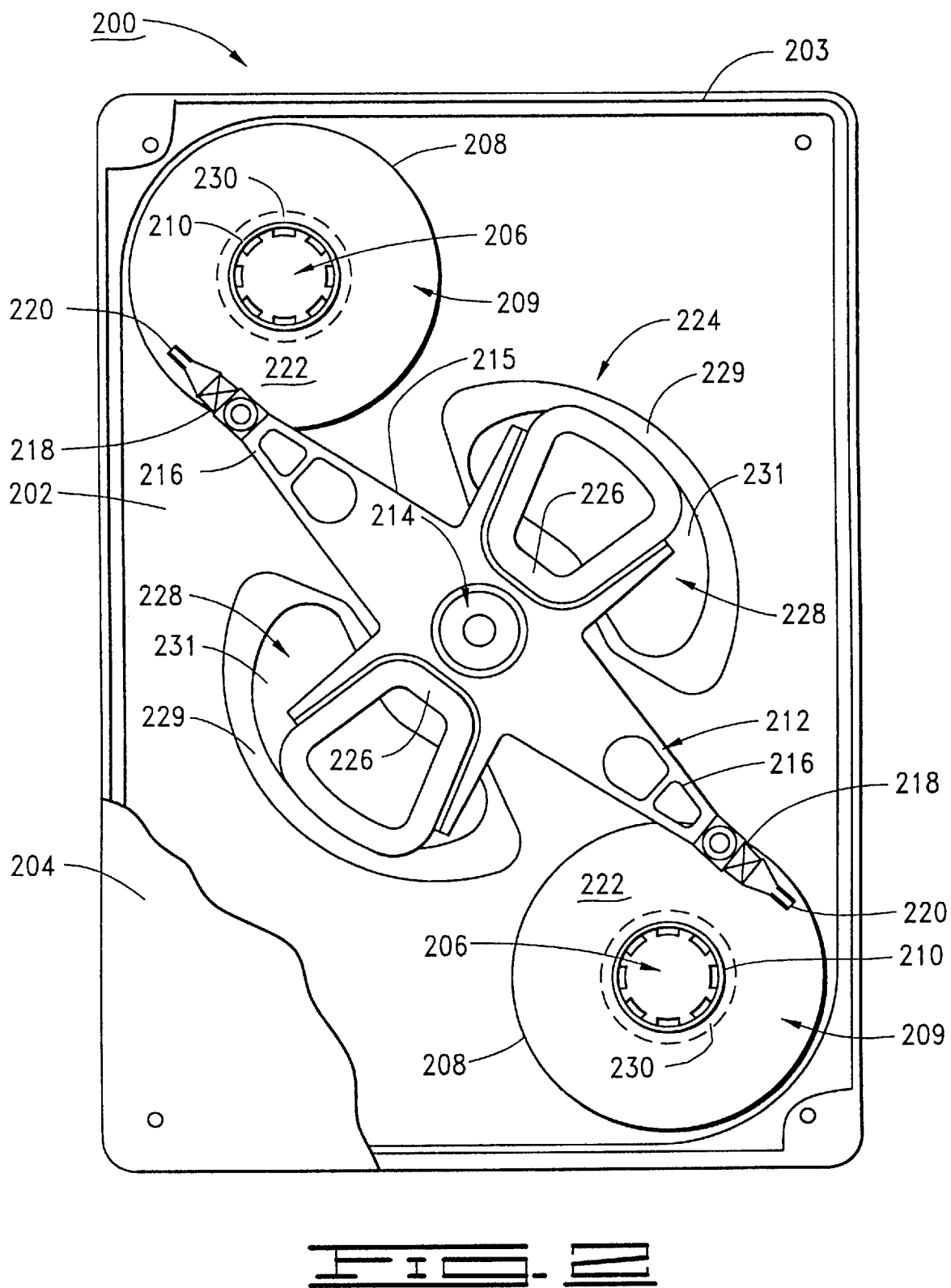
FIG. 2 is a top view of a disc drive constructed in accordance with a preferred embodiment of the present invention.

Turning now to FIG. 2, shown therein is a disc drive 200 that is constructed in accordance with a preferred embodiment of the present invention. The disc drive 200 has a base deck 202 to which various disc drive components are mounted, and a top cover 204, which together with the base deck 202 and a perimeter gasket 203 provide a sealed internal environment for the disc drive 200. The top cover 204 is shown in a partial cut-away fashion to expose selected components of interest. As in the prior art disc drive 100, numerous details of construction that are well known to those skilled in the art are unnecessary for the purpose of describing the present invention and are therefore not included as part of the following description.

Mounted to the base deck 202 are a pair of spindle motors 206, each having a plurality of discs 208 mounted thereto and secured by a clamp ring 210 for high speed rotation. The spindle motor 206 and discs 208, secured by the clamp ring 210, form a disc pack assembly 209. It will be noted that each disc pack assembly 209 is independently rotated by the associated spindle motor 206.

Adjacent the discs 208 is an actuator assembly 212 which pivots about a pivot shaft bearing 214. The actuator assembly 212 includes an E-block 215 that is supported by the pivot shaft bearing 214. The E-block 215 has actuator arms 216 (only two shown) that support load arm assemblies 218. The load arm assemblies 218, in turn, support read/write heads 220, with each of the read/write heads 220 adjacent a surface of one of the discs 208. Each of the discs 208 has a data recording surface 222 divided into concentric circular data tracks (not shown), and the read/write heads 220 are positionably located adjacent data tracks to read data from and write data to the tracks.

The actuator assembly 212 is controllably positioned by a voice coil motor assembly (VCM) 224 which has a pair of opposed actuator coils 226 immersed in the magnetic field generated by a magnet assembly 228. A pair of steel plates 229 sandwich a pair of magnet members 231 around each actuator coil 226 to provide the magnetic circuit of the VCM 224. It will be noted in FIG. 2 the upper steel plate 229 and upper magnet member 231 are omitted in order to show the actuator coils 226 and the bottom steel plates 229 and bottom magnet members 231. When controlled current is passed through the actuator coils 226, an electromagnetic field is set up which interacts with the magnetic circuit of the VCM 224 to cause the actuator coils 226 to move relative to the adjacent magnet assembly 228 in accordance with the well-known Lorentz relationship. As each actuator coil 226 moves, the actuator assembly 212 pivots about the pivot shaft bearing 214, causing the actuator arms 216 to move the read/write heads 220 adjacent to, and across, the discs 208.

Located near the inner clamp ring 210 are parking surfaces 230, the parking surfaces 230 being non-data surfaces that are designated areas where the read/write heads 220 come to rest when the disc drive 200 becomes non-operational, the provision of the parking surfaces 230 preventing the read/write heads 220 from damaging any data storage locations.

To provide the requisite electrical conduction paths between the read/write heads 220 and disc drive read/write circuitry (not shown), head wires (not separately shown) are routed on the actuator assembly 212 from the read/write heads 220, along the load arm assemblies 218 and the actuator arms 216, to a printed circuit board (not shown). The head wires are secured by way of a suitable soldering process to corresponding pads of the printed circuit board. A flex circuit (not shown) is connected to the printed circuit board, which, in turn, is connected to an electrical connector which provides electrical connection through the base deck 202 to a disc drive printed circuit board (not shown) mounted to the underside of the base deck 202. The disc drive printed circuit board provides the disc drive read/write circuitry which controls the operation of the read/write heads 220, as well as other interface and control circuitry for the disc drive 200.

Figure 3:
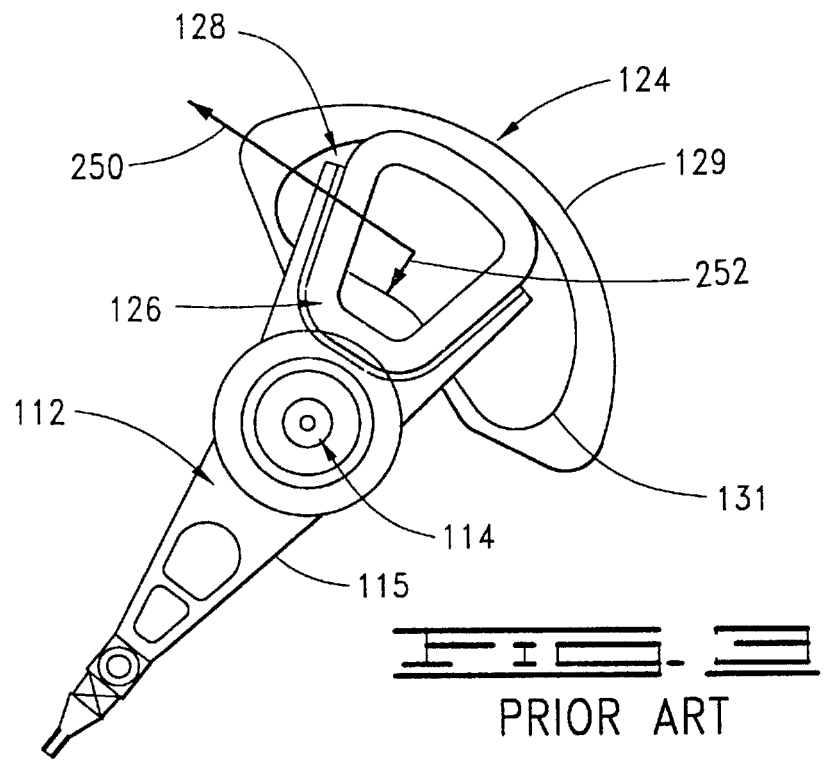
FIG. 3 is a top view of the actuator and magnet assembly of the prior art disc drive of FIG. 1.

FIG. 3 is a top view of the actuator assembly 112 and VCM 124 of the prior art disc drive 100 of FIG. 1. It will be noted that the upper steel plates 129 and the upper magnet member 131 have been omitted for clarity. As described hereinabove, the passing of a controlled current through the actuator coil 126 produces an electromagnetic field which interacts with the magnetic field provided by the magnet assembly 128 to rotate the E-block 115 about the pivot shaft bearing 114. To rotate the E-block 115 this interaction creates a rotational force. The rotational force has a tangential coordinate force which acts in a direction shown by the arrow 250, as well as a translational coordinate force which acts transversely to the translational force in a direction shown by the arrow 252.

The tangential force acts tangentially to the axis of rotation of the pivot shaft bearing 114. Thus the actuator assembly 112 responds to the tangential force by pivoting about the pivot shaft bearing 114. The translational force acts radially to the axis of rotation of the pivot shaft bearing 114. As such, the translational force is an out-of-plane force with respect to those forces tending to rotate the actuator assembly 112. The translational force tends to tip the effective bearing axis as a result of the lateral force on the pivot shaft bearing 114 causing a misalignment between the rotating sleeve and the bearing axis, as discussed below. The magnitude of the misalignment is determined by the radial stiffness of the bearing, which can be increased by increasing the pre-load on the bearing. This has an adverse effects, however, in that increasing the rotational friction in the bearing can shorten the life of the bearing and can create vibrations associated with rotational motion of the actuator about the bearing. Whatever magnitude of the misalignment, it will be noted that the cause of the misalignment stems from the non-uniform distribution of translational forces on the pivot shaft bearing 114.

Figure 4:
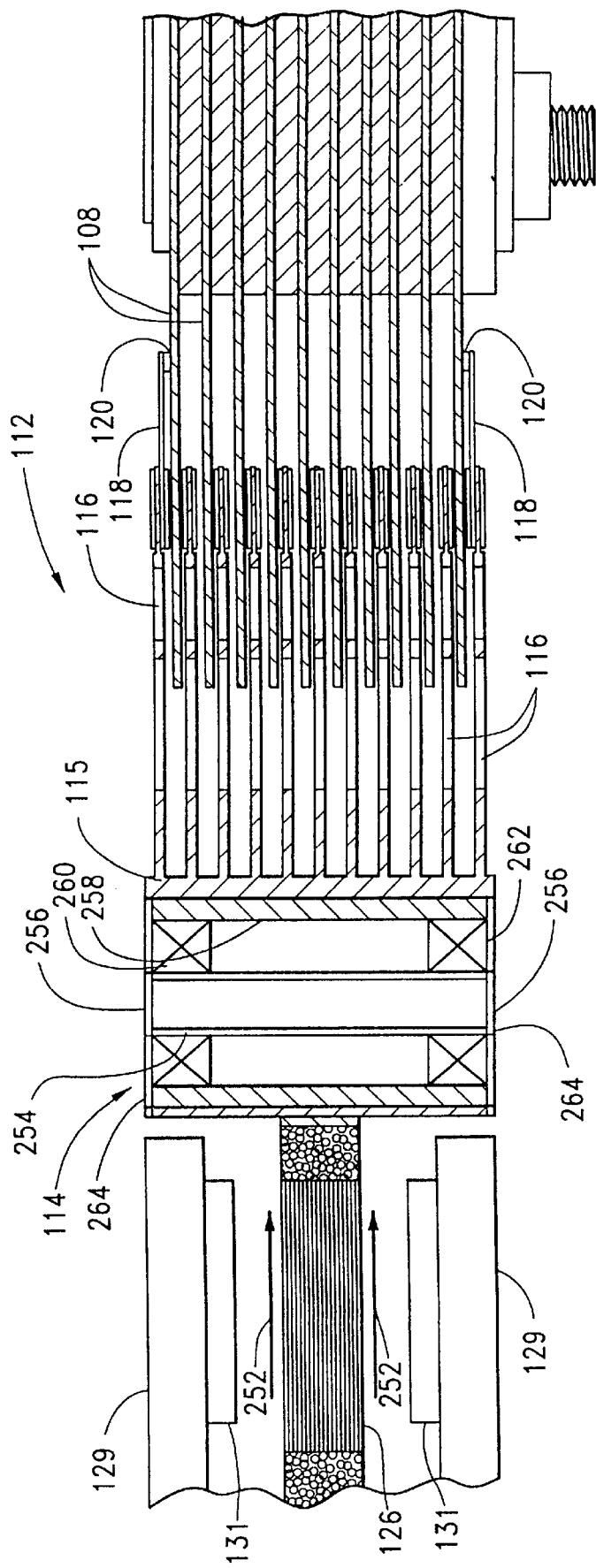
FIG. 4 is an elevational view of an actuator and magnet assembly of a prior art disc drive.

FIG. 4 is a partial sectional view of the prior art disc drive 100, showing the actuator assembly 112 which pivots about the pivot shaft bearing 114 (depicted diagrammatically) to position the plurality of read/write heads 120 (only 2 shown) in relationship to the plurality of discs 108. It will be understood that the spatial relationship of each read/write head 120 to the corresponding disc 108 is determined in part by the pivot shaft bearing 114.

The pivot shaft bearing 114 is a conventional component widely used in the art and need not be described in detail herein except as follows. The pivot shaft bearing 114 has a stationary shaft 254 with openings 256 on both ends thereof to receive fasteners (not shown) which supportingly connect the pivot shaft bearing 114 between the base deck 102 and the top cover 104 of the disc drive 100. The stationary shaft 254 defines the bearing axis of rotation. The pivot shaft bearing 114 furthermore has a hollow sleeve 258 coaxially disposed about the stationary shaft 254 and supported for rotation thereabout by an upper bearing 260 and a lower bearing 262. Upper and lower labyrinth seals 264 are provided to seal the open ends of the pivot shaft bearing 114.

The E-block 115 is rigidly affixed to the sleeve 258 typically by a mechanical fastener, such as a screw or by adhesive. The lateral stability of the E-block 115, and hence of the read/write heads 120 which are supported at a distal end thereof, is dependent on the radial stiffness of the pivot shaft bearing 114. The translational force described above which acts on the actuator coil 126 in a direction along the arrows 252 imparts forces tending to tip the sleeve 258 relative to the axis of rotation causing axial misalignment. The amount of tipping displacement is dependent on the precision characteristics of the pivot shaft bearing 114, but it will be noted that in order to provide the necessary freedom of rotational motion without undue friction there is a certain amount of bearing play, or freedom of lateral movement of the sleeve 258 relative the stationary shaft 254.

Figure 5:
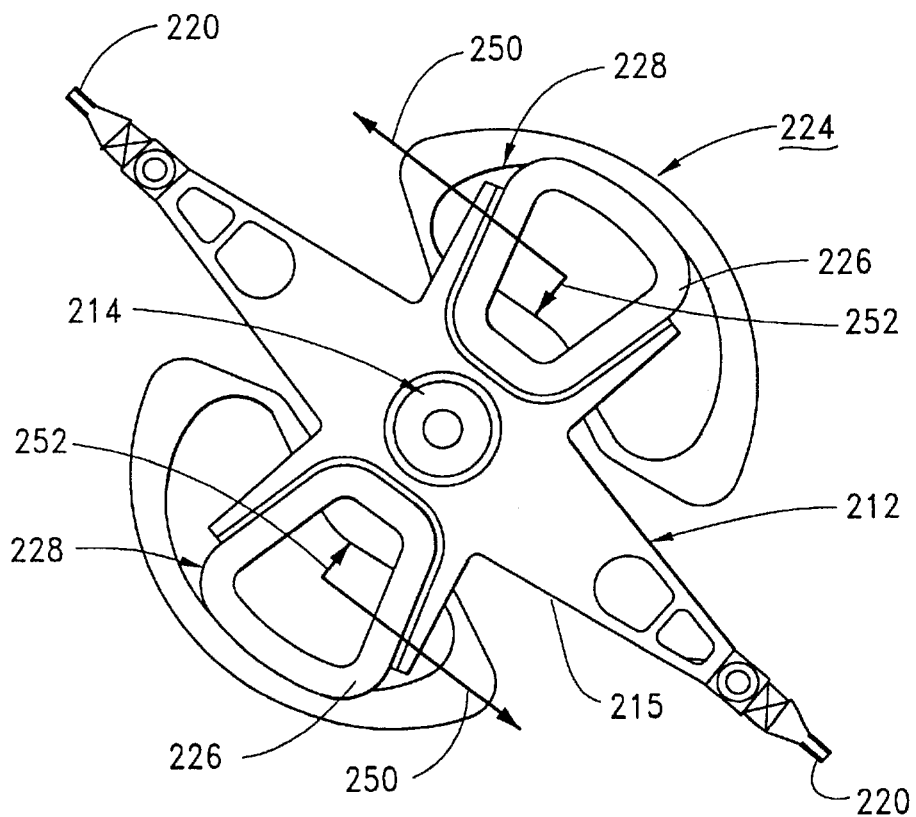
FIG. 5 is a top view of the actuator and disc pack assemblies of the disc drive of FIG. 2.

The actuator assembly 212 of the present invention, as shown in FIG. 5, (note that top steel plate 229 and top magnet member 231 are not shown) has opposing actuator coils 226 which each interact with one of dual opposing magnet assemblies 228 to produce opposing translational forces acting along the directions denoted by arrows 252. In this manner, the opposing translational forces act on opposite sides of the pivot shaft bearing 214 and, in effect, balance each other out so as to stabilize the pivot bearing. This stability from the uniform distribution of the radial translational forces prevents resonance in the E-block 115 that is otherwise transmitted and into the read/write heads 120 from an unbalanced distribution of such out-of-plane forces.

It will be noted that the actuator coils 226 are wound in the same direction so that the controlled voltage thereto creates a counter-clockwise tangential force along the direction denoted by arrow 250 so that the tangential forces of the opposing actuator coils 226 are additive in acting on and rotating the actuator assembly 212 about the pivot shaft bearing 214.

It will be further noted that by utilizing the actuator assembly 212 of the present invention with two disc packs 209, the total data storage capacity as compared to the prior art disc drive 100 can be significantly increased while decreasing the diameter of the discs 208. It is well known that reducing the diameter of the discs 208 provides a disc pack 209 with more resilience to external shock and vibration. This is the result of a relatively shorter cantilevered action of the centrally supported discs 208 as well as the requirement for shorter actuator arms 216 in support of the read/write heads 220.

The preferred embodiment of the present invention has an actuator assembly 212 with a dual array of actuator arms 216 for supporting an array of read/write heads 220 adjacent each of a pair of disc packs 209. Improvements in operational resonance are achieved by using a pair of actuator coils 226 and magnet assemblies 228 so that opposing translational forces produced by the VCM 224 are uniformly distributed about the pivot shaft bearing 214. It will be understood by one skilled in the art that the use of opposing actuator coils 226 and magnet assemblies 228 would yield the same resonance reducing result on an actuator assembly having only one array of actuator arms 216 in conjunction with a single disc pack, so long as the arrangement of the actuator coils 226 and magnet assemblies 228 are similarly situated to uniformly distribute the translational forces on the pivot shaft bearing 214.

In the preferred embodiment of the present invention, hereinabove the disc drive has been disclosed as having a pair of disc packs with a single actuator supporting an array of read/write heads for each disc pack. The manner in which the servo control system controls the positioning of the read/write heads is analogous to that which is widely known and practiced in the art for single disc pack disc drives, and as such a detailed description of the control system is not necessary for an understanding of the present invention. It will suffice to know that the servo information is written to discs of each disc pack, and that the data can be read from each of the discs for any given position of the actuator by electronically switching from one array to the other array of read/write heads.

The present invention provides a disc drive (such as 200) employing a voice coil motor assembly (such as 224) with dual opposing actuator coils (such as 226) which in conjunction with dual opposing magnet assemblies (such as 228) impart a rotational force to an actuator assembly (such as 212) supported by a pivot shaft bearing (such as 214). The actuator assembly has an E-block (such as 215) which provides two opposing arrays of actuator arms (such as 216) which each support a read/write heads (such as 220) in data read and write relationship to disc packs (such as 209). The disc packs each have a plurality of discs (such as 208) which are supported by a spindle motor (such as 206) for rotation thereof.

The opposing actuator coils provide offsetting translational forces on the actuator assembly which stabilizes the support thereof and minimizes the resonance produced by out-of-plane forces acting transversely on the pivot shaft bearing. The dual disc packs have reduced diameter discs, in comparison to the same capacity single disc pack prior art disc drive, which provide increased resilience to external shock and vibration.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. An actuator for a disc drive assembly, the disc drive assembly having a first disc supported by a first spindle fixed to a base deck and having a second disc supported by a second spindle fixed to the base deck, the actuator comprising:

an E-block pivotally supported by the base deck about a pivot point;

a first read/write head supported by the E-block in operable relationship to the first disc;

a second read/write head supported by the E-block in operable relationship to the second disc; and a pair of opposed actuator coils supported by the E-block which, when electrically energized with a controlled current, rotates the E-block about the pivot point, the pair of actuator coils comprising a first actuator coil and a second actuator coil opposed to the first actuator coil, the pair of actuator coils oriented upon the E-block such that a center of gravity for the actuator assembly is located at the pivot point and a cancellation of translation forces generated during E-block rotation occurs through the pivot point.

2. The actuator of claim 1, wherein the disc drive assembly further comprises a top cover and the actuator further comprises a pivot shaft bearing, the pivot shaft bearing comprising:

a stationary shaft supported by the base deck and the top cover;

a roller bearing supported by the stationary shaft; and a sleeve supported by the roller bearing in rotation about the stationary shaft, the sleeve supporting the E-block.

3. The actuator of claim 2, wherein the actuator further comprises a magnet member, and wherein electrically energizing the actuator coils produces an electromagnetic field that interacts with a magnetic field of the magnet member to provide a rotating force to rotate the E-block about the pivot shaft bearing so that the read/write heads move radially across the discs.

4. The actuator of claim 3, wherein the magnet member comprises:

a first magnet assembly, comprising:

a first lower pole member supported by the base deck;

a first lower magnet supported by the first lower pole member;

a first upper pole member supported by the top cover; and a first upper magnet supported by the first upper pole member; and a second magnet assembly, comprising:

a second lower pole member supported by the base deck;

a second lower magnet supported by the second lower pole member;

a second upper pole member supported by the top cover; and a second upper magnet supported by the second upper pole member.

5. The actuator of claim 4, wherein the first lower magnet and second lower magnet are spatially disposed adjacent the first upper magnet and second upper magnet, and wherein the first actuator coil and second actuator coil are interposed between the first upper magnet and first lower magnet and between the second upper magnet and second lower magnet, respectively.

6. The actuator of claim 5, wherein the rotating force comprises tangential forces and translational forces, the tangential forces tending to rotate the E-block about the pivot shaft bearing and the translational forces tending to provide opposing radial forces on the pivot shaft bearing.

7. A disc drive, comprising:

a base deck;

a first disc assembly comprising:

a first spindle motor supported by the base deck; and a first disc supported by the first spindle motor for rotation when the disc drive is operational, the first disc having a data recording surface and a landing surface;

a second disc assembly comprising:

a second spindle motor supported by the base deck; and a second disc supported by the second spindle motor for rotation when the disc drive is operational, the second disc having a data recording surface and a landing surface;

an actuator supported by the baseplate, the actuator having an E-block supported about a pivot point;

a first read/write head supported by the E-block adjacent the first disc;

a second read/write head supported by the E-block adjacent the second disc; and a pair of opposed actuator coils supported by the E-block which, when electrically energized with a controlled current, rotates the E-block about the pivot point, the pair of actuator coils comprising a first actuator coil and a second actuator coil opposed to the first actuator coil, the pair of actuator coils oriented upon the E-block such that a center of gravity for the actuator assembly is located at the pivot point and a cancellation of translation forces generated during E-block rotation occurs through the pivot point.

8. The disc drive of claim 7, wherein the E-block is pivotally supported by the base deck so that the read/write heads are positionable adjacent the data recording surfaces and the landing surfaces.

9. The disc drive of claim 8, wherein the actuator is disposed between the disc assemblies, the actuator having a pivot mechanism for commonly pivoting the read/write heads.

10. The disc drive of claim 9, further comprising a top cover, wherein the actuator further comprises a pivot shaft bearing, comprising:

a stationary shaft supported by the base deck and the top cover;

a roller bearing supported by the stationary shaft; and a sleeve supported by the roller bearing in rotation about the stationary shaft, the sleeve supporting the E-block.

11. The disc drive of claim 10, wherein the pair of opposed actuator coils, when energized with the controlled current, selectively positions the read/write heads adjacent the data recording surfaces and the landing surfaces.

12. The disc drive of claim 11, wherein the actuator further comprises a magnet member, and wherein electrically energizing the actuator coils produces an electromagnetic field that interacts with a magnetic field of the magnet member to provide a rotating force to rotate the E-block about the pivot shaft bearing so that the read/write heads move radially across the discs.

13. The disc drive of claim 12, wherein the magnet member comprises:

a first magnet assembly, comprising:
      a first lower pole member supported by the base deck;
      a first lower magnet supported by the first lower pole member;
      a first upper pole member supported by the top cover; and
      a first upper magnet supported by the first upper pole member; and a second magnet assembly, comprising:
      a second lower pole member supported by the base deck;
      a second lower magnet supported by the second lower pole member;
      a second upper pole member supported by the top cover; and
      a second upper magnet supported by the second upper pole member.

14. The disc drive of claim 13, wherein the first lower magnet and second lower magnet are spatially disposed adjacent the first upper magnet and second upper magnet, and wherein the first actuator coil and second actuator coil are interposed between the first upper magnet and first lower magnet and between the second upper magnet and second lower magnet, respectively.

15. The disc drive of claim 14, wherein the rotating force comprises rotational forces and translational forces, the rotational forces tending to rotate the E-block about the pivot shaft bearing and the translational forces tending to provide opposing radial forces on the pivot shaft bearing.

* * * * *